(12) United States Patent
Bednarek

(10) Patent No.: US 12,508,398 B2
(45) Date of Patent: Dec. 30, 2025

(54) MEDICAL DEVICE INCLUDING SHAFT WITH FLAT WIRE COIL

(71) Applicant: Greatbatch Ltd., Clarence, NY (US)

(72) Inventor: Michael C. Bednarek, Buffalo, MN (US)

(73) Assignee: Greatbatch Ltd., Clarence, NY (US)

( * ) Notice: Subject to any disclaimer, the term of this patent is extended or adjusted under 35 U.S.C. 154(b) by 1134 days.

(21) Appl. No.: 17/482,715

(22) Filed: Sep. 23, 2021

(65) Prior Publication Data

US 2022/0096792 A1    Mar. 31, 2022

Related U.S. Application Data (60) Provisional application No. 63/083,651, filed on Sep. 25, 2020.

(51) Int. Cl.
*A61M 25/00* (2006.01)
*A61F 2/24* (2006.01)

(52) U.S. Cl.
CPC ....... *A61M 25/0053* (2013.01); *A61F 2/2427* (2013.01); *A61M 2025/0047* (2013.01)

(58) Field of Classification Search
CPC ............ A61M 25/005; A61M 25/0052; A61M 25/0053; A61M 25/0054; A61M 2025/0059; A61F 2/2427; A61F 2/2433
See application file for complete search history.

(56) References Cited

U.S. PATENT DOCUMENTS

| | | | |
|---|---|---|---|
| 6,572,610 B2 | 6/2003 | Kovalcheck et al. | |
| 7,162,310 B2 | 1/2007 | Doan | |
| 7,968,038 B2 | 6/2011 | Dittman et al. | |
| 9,114,229 B2 | 8/2015 | Fuentes | |
| 10,441,290 B2 | 10/2019 | Rudakov et al. | |
| 10,668,258 B1 * | 6/2020 | Calhoun | A61M 25/104 |
| 2002/0133141 A1 | 9/2002 | Sparks et al. | |
| 2006/0095050 A1 | 5/2006 | Hartley et al. | |

FOREIGN PATENT DOCUMENTS

| | | |
|---|---|---|
| AT | 13758 U1 | 8/2014 |
| GB | 1208639 A | 10/1970 |
| JP | 2016002201 A | 1/2016 |
| WO | 2018127333 A1 | 7/2018 |

* cited by examiner

*Primary Examiner* — Nilay J Shah
(74) *Attorney, Agent, or Firm* — Michael P. Horvath (57) ABSTRACT

In various examples, a shaft for an elongate medical device extends along a shaft length. The shaft includes a shaft axis, an outer surface, and an inner surface. The inner surface defines an inner lumen. A liner forms the inner surface of the shaft. A coil is disposed around and outwardly from the liner. The coil is formed from a flat wire. The flat wire includes a wire width and a wire height, wherein the wire height is greater than the wire width. The wire height extends substantially radially with respect to the shaft and the wire width extends substantially longitudinally with respect to the shaft. A jacket is disposed around and outwardly from the coil. The jacket forms the outer surface of the shaft.

20 Claims, 5 Drawing Sheets

FIG. 8

MEDICAL DEVICE INCLUDING SHAFT WITH FLAT WIRE COIL

CROSS REFERENCE TO RELATED APPLICATIONS

This application claims the benefit of priority to U.S. Provisional Application Ser. No. 63/083,651, filed on Sep. 25, 2020, entitled "SHAFT STRUCTURE USING FLAT WIRE COILED ON EDGE," which is incorporated by reference herein in its entirety.

BACKGROUND

Elongate medical devices, such as, for instance, delivery system devices for structural heart implant delivery, often require relatively high tensile and compressive forces for advancement and retraction of an implant device from the delivery system. In addition, the medical device is often required to have sufficient flexibility and torque response to navigate the human anatomy from the device insertion site, for instance, at the femoral artery or vein, passing through the vessels to the target site, such as, for instance, the heart, and orienting properly to the anatomy, such as, for instance, heart valves, for delivery of the implant or other device held within the medical device, such as, for instance, the delivery system. To achieve these performance requirements, a shaft of the elongate medical device can be designed with one or more components in the shaft wall to provide tensile strength, radial strength, compressive strength, torquability, and/or flexibility. In general, with respect to shaft design, as tensile, compression, or torque performance requirements are increased, flexibility decreases as the overall device structure becomes stiffer. It would be beneficial in shaft design for such elongate medical devices to be able to increase shaft tensile strength, compressive strength, and torque performance while still maintaining or even improving shaft flexibility.

Overview

This overview is intended to provide an overview of subject matter of the present patent document. It is not intended to provide an exclusive or exhaustive explanation of the invention. The detailed description is included to provide further information about the present patent document.

The present inventors have recognized, among other things, that the present subject matter can be used to provide for elongate medical devices, such as, for instance, delivery system devices for structural heart implant delivery, with improved flexibility, radial strength, and kink resistance in bending over that of a conventional elongate medical device. In various examples, the present subject matter is advantageous in that it provides greater compression strength and reduces compression deflection over conventional elongate medical devices. In some examples, this improved performance is due to the wider surface area of wire faces in contact, near contact, or close proximity with one another as a coil of the present inventive subject matter is collapsed in an axial direction of the coil. In some examples, the present invention provides for a reinforcement member to provide radial strength from device crushing and maintain a high level of flexibility in bending, which, in combination with radial strength, helps improve the kink resistance of the shaft when it is bent into a small radius. To better illustrate the devices and methods described herein, a non-limiting list of examples is provided here:

Example 1 can include subject matter that can include a shaft for an elongate medical device. The shaft extends along a shaft length. The shaft includes a shaft axis, an outer surface, and an inner surface. The inner surface defines an inner lumen. The shaft includes a liner forming the inner surface of the shaft. A coil is disposed around and outwardly from the liner. The coil is formed from a flat wire. The flat wire includes a wire width and a wire height. The wire height is greater than the wire width. The wire height extends substantially radially with respect to the shaft, and the wire width extends substantially longitudinally with respect to the shaft. A jacket is disposed at least around and outwardly from the coil. The jacket forms the outer surface of the shaft.

In Example 2, the subject matter of Example 1 is optionally configured such that the coil includes a coil axis that is disposed substantially colinear to the shaft axis.

In Example 3, the subject matter of Example 2 is optionally configured such that the wire width is measured parallel to the coil axis and the wire height is measured perpendicular to the coil axis.

In Example 4, the subject matter of any one of Examples 1-3 is optionally configured such that a pitch of the coil is substantially consistent along a coil length.

In Example 5, the subject matter of any one of Examples 1–4 is optionally configured such that a pitch of the coil is substantially equal to twice the wire width.

In Example 6, the subject matter of any one of Examples 1-5 is optionally configured such that a pitch is variable along the shaft length to provide different shaft performance characteristics over the shaft length.

In Example 7, the subject matter of any one of Examples 1-6 is optionally configured such that the liner is formed from a lubricious material.

In Example 8, the subject matter of any one of Examples 1-7 optionally includes a material disposed within gaps of the coil, the material configured to provide compression support for the coil.

In Example 9, the subject matter of Example 8 is optionally configured such that the material disposed within the gaps of the coil includes a polymeric material.

In Example 10, the subject matter of any one of Examples 1-9 optionally includes a braid layer disposed between the liner and the jacket, the braid layer configured to increase tensile strength for the shaft.

Example 11 can include, or can optionally be combined with any one of Examples 1-10 to include subject matter that can include an elongate medical device including a shaft extending along a shaft length. The shaft includes a shaft axis, an outer surface, and an inner surface. The inner surface defines an inner lumen. The shaft includes a liner forming the inner surface of the shaft. A coil is disposed around and outwardly from the liner. The coil is formed from a flat wire. The flat wire includes a wire width and a wire height. The wire height is greater than the wire width. The wire height extends substantially radially with respect to the shaft, and the wire width extends substantially longitudinally with respect to the shaft. A jacket is disposed at least around and outwardly from the coil. The jacket forms the outer surface of the shaft.

In Example 12, the subject matter of Example 11 is optionally configured such that the coil includes a coil axis that is disposed substantially colinear to the shaft axis.

In Example 13, the subject matter of Example 12 is optionally configured such that the wire width is measured parallel to the coil axis and the wire height is measured perpendicular to the coil axis.

In Example 14, the subject matter of any one of Examples 11-13 optionally includes a material disposed within gaps of the coil, the material configured to provide compression support for the coil.

In Example 15, the subject matter of any one of Examples 11-14 optionally includes a braid layer disposed between the liner and the jacket, the braid layer configured to increase torque strength for the shaft.

Example 16 can include, or can optionally be combined with any one of Examples 1-15 to include subject matter that can include a shaft for an elongate medical device. The shaft extends along a shaft length. The shaft includes a shaft axis, an outer surface, and an inner surface. The inner surface defines an inner lumen. The shaft includes a liner forming the inner surface of the shaft. A coil is disposed around and outwardly from the liner. The coil includes a coil axis that is disposed substantially colinear to the shaft axis. The coil is formed from a flat wire. The flat wire includes a wire width and a wire height. The wire height is greater than the wire width. The wire width is measured parallel to the coil axis, and the wire height is measured perpendicular to the coil axis. A material is disposed within gaps of the coil. The material is configured to provide compression support for the coil. A jacket is disposed at least around and outwardly from the coil. The jacket forms the outer surface of the shaft.

In Example 17, the subject matter of Example 16 is optionally configured such that a pitch of the coil is substantially consistent along a coil length.

In Example 18, the subject matter of Example 16 or 17 is optionally configured such that a pitch is variable along the shaft length to provide different shaft performance characteristics over the shaft length.

In Example 19, the subject matter of any one of Examples 16-18 is optionally configured such that the liner is formed from a lubricious material.

In Example 20, the subject matter of any one of Examples 16-19 optionally includes a braid layer disposed between the liner and the jacket. The braid layer is configured to increase tensile strength or torque strength for the shaft.

DETAILED DESCRIPTION

The present invention relates generally to providing an elongate medical device, such as a sheath, catheter, introducer, or other implantable delivery system, that can withstand high tensile and/or compression forces and, at the same time, be flexible in order to curve in a relatively small radius. Such a device, in some examples, can be used for cardiac catheters to reach sites, such as heart valves, for instance, from an inferior approach through arteries or veins or in vascular catheters to pass through many vessels in a tortuous path to a target anatomical location. More specifically, the present invention can be used as a reinforcement member to provide radial strength from device crushing and maintain a high level of flexibility in bending, which, in combination with radial strength, helps improve the kink resistance of the shaft when it is bent into a small radius.

In some examples, a flat wire coiled on edge (that is, a thickness of the flat wire is greater than a width of the flat wire) forms a coil that provides a stable surface between coil loops when under compression. This is advantageous over typical coils, such as round wire coils or coils having flat wires wound such that a thickness of the flat wire is smaller than a width of the flat wire, where coil loops loaded in compression may slide past each other and deform the inner and outer diameters of the shaft. In some examples, a coil formed from a flat wire coiled on edge provides greater contact surface area for the same thickness of a coil formed from round wire. In some examples, an area moment of inertia for the coil formed from a flat wire on edge is higher than the coil formed from a round wire calculated in the plane of the shaft axis for the same size coil wire thickness. The higher number of wire loops per inch of the coil improves, in some examples, overall shaft flexibility, radial strength, and compression deflection.

In some examples, the coil includes a flat wire on edge having a helical pattern formed over a mandrel or inner shaft assembly with the flat wire applied where the width of the flat wire is smaller than the thickness of the flat wire. Essentially, in some examples, the flat wire of the coil is wrapped on its edge with a small even or variable pitch. Such a coil, in some examples, provides improved flexibility, radial strength, and kink resistance in bending over convention coils. Such a coil is advantageous in that it also provides greater compression strength and reduces compression deflection over the current art due to the wider surfaces area of the wire faces in contact with each other as the coil is collapsed in the axial direction of the coil. In some examples, the present inventive subject matter includes a coiled flat wire wound on its edge to provide a low wire pitch and a small amount of plastic resin flowed in between the wires to provide improved compression support for the coil loops.

Figure 1:
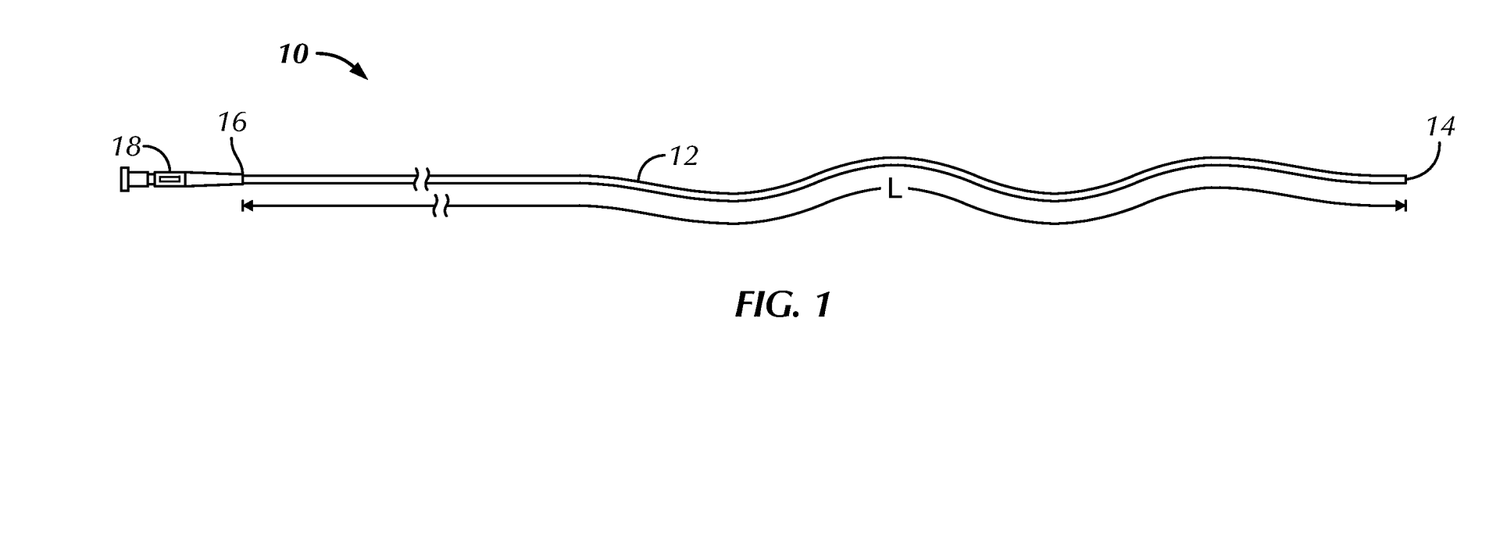
FIG. 1 is a perspective view of a medical device in which a coil in accordance with at least one example of the invention can be used.

Referring to FIG. 1, in some examples, the present subject matter can be used to improve performance and/or characteristics of a shaft 12 of an elongate medical device 10, such as a sheath, catheter, introducer, or other implantable delivery system. In some examples, the shaft extends from a distal end 14 to a proximal end 16 along a shaft length L. Various configurations of the distal end 14 are contemplated depending upon the application of the elongate medical device 10. For instance, in some examples, the distal end 14 can include an opening to a lumen of the shaft 12 of the elongate medical device 10. In other examples, however, the distal end can include other features, such as, but not limited to, one or more of a rounded, atraumatic tip; one or more electrodes; a balloon; a stent; a grasping apparatus; a needle or other puncturing device; and/or a radiopaque, echogenic, or other marker, either in addition to or instead of the opening to the lumen described above. In some examples, at the proximal end 16 of the shaft 12, the elongate medical device 10 can include a connector 18, such as, but not limited to, a luer connector. In other examples, depending upon the application of the elongate medical device, a handle and/or one or more controls can be disposed at the proximal end 16 of the shaft 12 of the elongate medical device 10, either in addition to or instead of the connector described above.

Figure 2A:
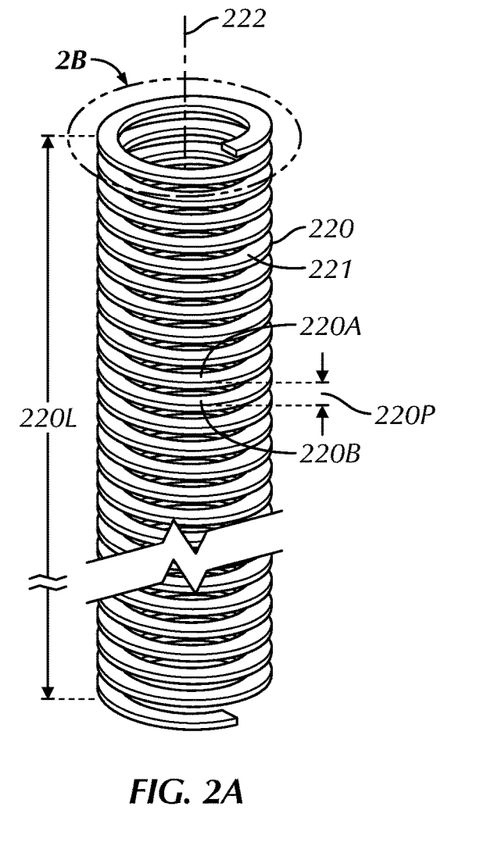
FIG. 2A is a perspective view of a coil in accordance with at least one example of the invention.
Figure 2B:
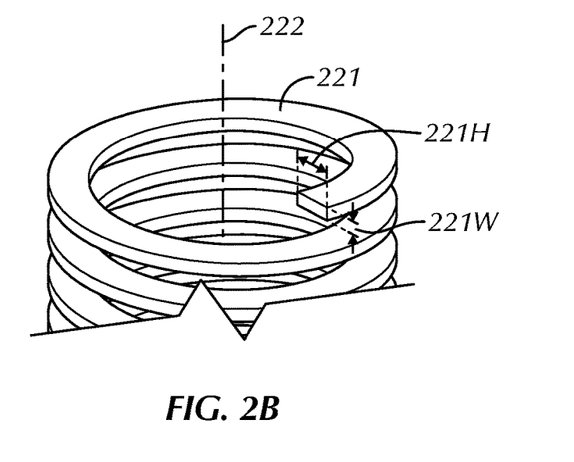
FIG. 2B is an enlarged perspective view a portion of the coil of FIG. 2A, the portion of the coil being disposed within the area denoted as 2B in FIG. 2A.

Referring to FIGS. 2A and 2B, in some examples, a coil 220 can be used with a shaft (such as, the shaft 12 of the elongate medical device 10 of FIG. 1, for instance) in order to improve performance characteristics, among other things, of the shaft. In some examples, the coil 220 includes a flat wire 221 formed into the coil 220. The term "flat" is being used herein to describe the flat wire 221 as being substantially flattened into a generally rectangular shape in cross section. It should be understood that, in some examples, by describing the flat wire 221 as "flat" does not require a perfectly flattened shape or a perfectly rectangular cross section and that the flat wire 221 being substantially flat and substantially rectangular in cross section is sufficient for the present inventive subject matter. In some examples, the coil 220 is formed such that it forms a generally tubular shape along a coil axis 222. In some examples, the coil 220 is formed by the flat wire 221 being coiled on edge. The phrase "coiled on edge" is used herein to describe the configuration and/or orientation of the flat wire 221 within the coil 220, namely, in some examples, the flat wire 221 having a height 221H extending substantially radially with respect to the coil 220 (and substantially perpendicular to the coil axis 222) and a width 221W extending substantially longitudinally with respect to the coil 220 (and substantially parallel to the coil axis 222).

In various examples, the coil 220 can be formed in various configurations depending upon the application and performance characteristics desired for the elongate medical device (such as the elongate medical device 10 of FIG. 1, for instance) within which the coil 220 is being used. For instance, in some examples, various sizes of the flat wire 221 are contemplated in order to provide different characteristics of the various examples of the flat wire 221. For instance, a cross-sectional area of the flat wire 221 can be increased in various examples, to generally provide greater strength (tensile, compressive, torque, and/or flexural) and greater rigidity. In other examples, the cross-sectional area of the flat wire 221 can be decreased to generally provide decreased strength (tensile, compressive, torque, and/or flexural) and greater flexibility. In other examples, the height 221H and width 221W of the flat wire 221 can be altered to provide different characteristics of the coil 220. In some examples, the height 221H of the flat wire 221 is equal to the width 221W of the flat wire 221 of the coil 220, such that the cross section of the flat wire 221 is substantially square-shaped. In other examples, the height 221H of the flat wire 221 is greater than the width 221W of the flat wire 221 of the coil 220.

In some examples, the coil 220 includes a pitch 220P, which is defined as a distance between adjacent windings, such as between winding 220A and winding 220B of the coil 220. In some examples, the pitch 220P can be used to impart performance characteristics to the coil 220. In some examples, the pitch 220P of the coil 220 is uniform along a coil length 220L. In other examples, the pitch 220P can vary along the coil length 220L. A smaller pitch 220P, in some examples, can give the coil 220 greater strength (tensile, compressive, and/or flexural) and greater rigidity. In other examples, a larger pitch 220P can give the coil 220 decreased strength (tensile, compressive, torque, and/or flexural) and greater flexibility. In various examples, the pitch 220P of the coil 220 can vary from close touching surfaces to several times the width 221W of the flat wire 221. In some examples, the pitch 220P of the coil 220 is twice the width 221W of the flat wire 221.

In various examples, the coil 220 can be formed from one or more different materials, depending upon the application for which the elongate medical device (such as the elongate medical device 10 of FIG. 1, for instance) within which the coil 220 is being used. In some examples, the coil 220 is formed from stainless steel. In other examples, the coil 220 can be formed from other ferric materials. In still other examples, the coil 220 can be formed from one or more non-ferric materials, such as, but not limited to, nickel and/or Nitinol. In some examples, the coil 220 can be formed from a combination of materials with different portions of the coil 220 being formed from different materials based upon the desired performance characteristics of each of the portions of the coil 220.

Figure 3:
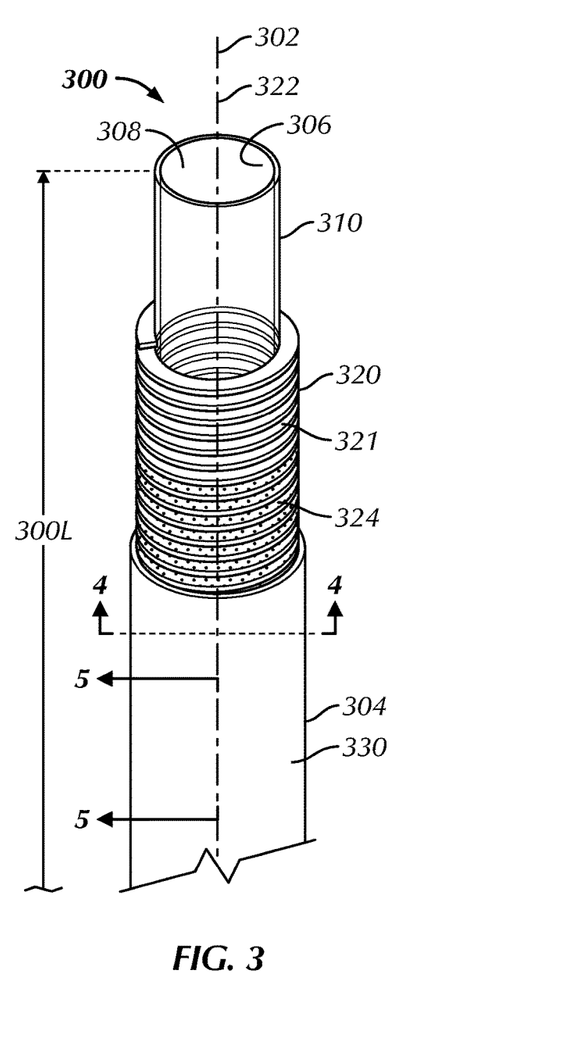
FIG. 3 is a partially cut away perspective view of a shaft of a medical device including a coil in accordance with at least one example of the invention.
Figure 4:
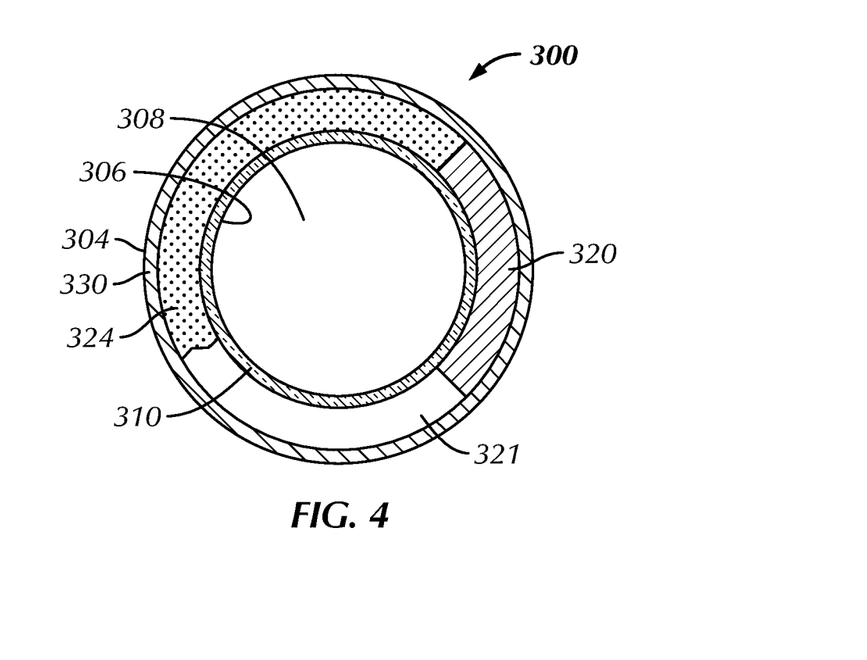
FIG. 4 is a cross-sectional view of a shaft of a medical device including a coil in accordance with at least one example of the invention, the cross section being taken along plane 4 of FIG. 3.
Figure 5:
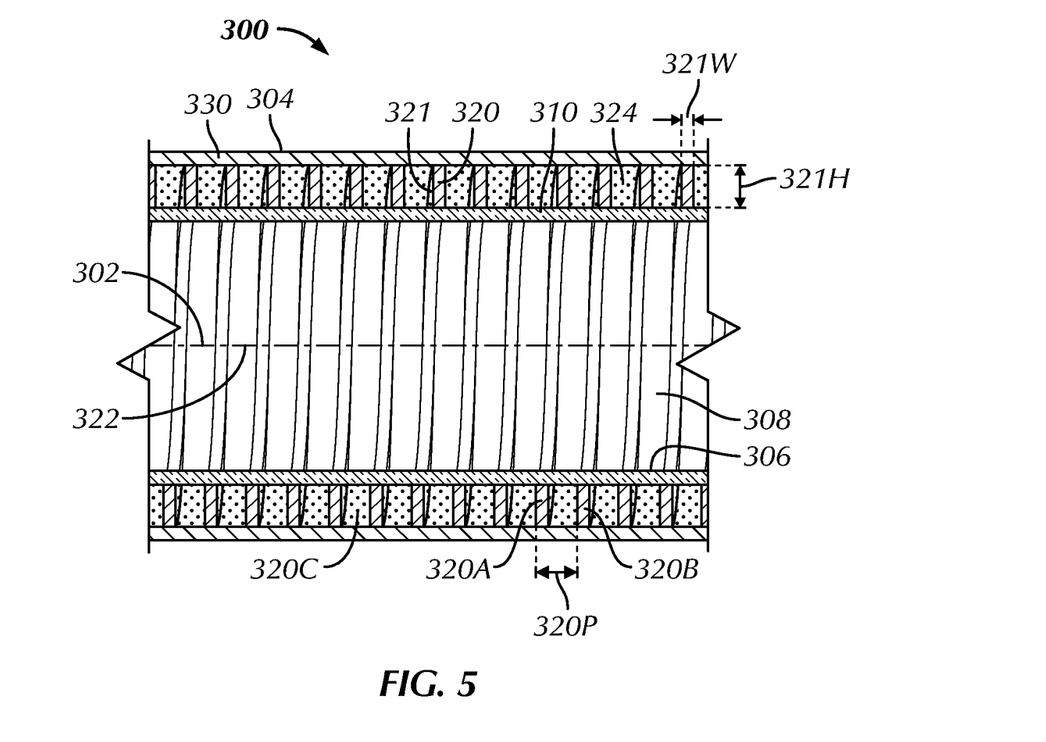
FIG. 5 is a cross-sectional view of a shaft of a medical device including a coil in accordance with at least one example of the invention, the cross section being taken along plane 5 of FIG. 3.

Referring to FIGS. 3-5, in some examples, a shaft 300 is shown for use with an elongate medical device (such as the elongate medical device 10 of FIG. 1, for instance). In some examples, the shaft 300 extends along a shaft length 300L and includes a shaft axis 302, an outer surface 304, and an inner surface 306. In some examples, the inner surface 306 is substantially cylindrical along the shaft length 300L defining an inner lumen 308 of the shaft 300.

In some examples, the shaft 300 includes a liner 310 forming the inner surface 306 of the shaft 300. In some examples, the liner 310 is formed from a lubricious material, for instance, to facilitate passing of devices within the lumen 308 of the shaft 300 by providing lubricity for devices passing through the lumen 308. In other examples, the liner 310 is formed from another material, such as a non-lubricious material, for instance, if it is desirable to have a lumen 308 with a less or non-lubricious surface.

In some examples, a coil 320 is disposed around and outwardly from the liner 310. In some examples, the coil 320 is similar to the coil 220 described above. In some examples, the coil 320 includes a flat wire 321 formed into the coil 320. In some examples, the coil 320 is formed such that it forms a generally tubular shape along a coil axis 322. In some examples, the coil axis 322 is disposed substantially colinear to the shaft axis 302 with the coil 320 disposed within the shaft 300. In some examples, the coil 320 is formed by the flat wire 321 being coiled on edge. In some examples, the flat wire 321 includes a height 321H extending substantially radially with respect to the coil 320 and the shaft 300 (and substantially perpendicular to the coil axis 322) and a width 321W extending substantially longitudinally with respect to the coil 320 and the shaft 300 (and substantially parallel to the coil axis 322).

In various examples, the coil 320 can be formed in various configurations depending upon the application and performance characteristics desired for the elongate medical device (such as the elongate medical device 10 of FIG. 1, for instance) within which the coil 320 is being used. For instance, in some examples, various sizes of the flat wire 321 are contemplated in order to provide different characteristics of the various examples of the flat wire 321. For instance, a cross-sectional area of the flat wire 321 can be increased in various examples, to generally provide greater strength (tensile, compressive, torque, and/or flexural) and greater rigidity. In other examples, the cross-sectional area of the flat wire 321 can be decreased to generally provide decreased strength (tensile, compressive, torque, and/or flexural) and greater flexibility. In other examples, the height 321H and width 321W of the flat wire 321 can be altered to provide different characteristics of the coil 320. In some examples, the height 321H of the flat wire 321 is equal to the width 321W of the flat wire 321 of the coil 320, such that the cross section of the flat wire 321 is substantially square-shaped. In other examples, the height 321H of the flat wire 321 is greater than the width 321W of the flat wire 321 of the coil 320.

In some examples, the coil 320 includes a pitch 320P, which is defined as a distance between adjacent windings, such as between winding 320A and winding 320B of the coil 320. In some examples, the pitch 320P can be used to impart performance characteristics to the coil 320. In some examples, the pitch 320P of the coil 320 is substantially uniform or consistent along a coil length. In other examples, the pitch 320P can vary along the coil length. A smaller pitch 320P, in some examples, can give the coil 320 greater strength (tensile, compressive, torque, and/or flexural) and greater rigidity. In other examples, a larger pitch 320P can give the coil 320 decreased strength (tensile, compressive, torque, and/or flexural) and greater flexibility. In some examples, the pitch 320P is variable along the coil length and, in turn, the shaft length 300L, to provide different performance characteristics of the shaft 300 over the shaft length 300L. In various examples, the pitch 320P of the coil 320 can vary from close touching surfaces to several times the width 321W of the flat wire 321. In some examples, the pitch 320P of the coil 320 is twice the width 321W of the flat wire 321.

In various examples, the coil 320 can be formed from one or more different materials, depending upon the application for which the elongate medical device (such as the elongate medical device 10 of FIG. 1, for instance) within which the coil 320 is being used. In some examples, the coil 320 is formed from stainless steel. In other examples, the coil 320 can be formed from other ferric materials. In still other examples, the coil 320 can be formed from one or more non-ferric materials, such as, but not limited to, nickel and/or Nitinol. In some examples, the coil 320 can be formed from a combination of materials with different portions of the coil 320 being formed from different materials based upon the desired performance characteristics of each of the portions of the coil 320.

In some examples, a material 324 is disposed within gaps 320C of the coil 320. In some examples, the gaps 320C are in between windings (such as, for instance, the windings 320A and 320B) of the coil 320. In some examples, the material 324 is configured to provide compression support for the coil 320, such that the material helps to maintain spacing in between the windings of the coil 320 under compressive loading of the coil 320. In some examples, the material 324 inhibits compression of the coil 320 under compressive loading while still allowing some compression of the coil 320 as well as flexibility of the coil 320 in bending. In some examples, the material 324 is used to fill the gaps 320C in the coil 320 to secure the coil 320 in place during subsequent assembly operations of the shaft 300. In some examples, the material 324 includes a separate component that is placed over the coil 320 once the coil 320 is assembled onto the shaft 300, which is then heated to flow into the gaps 320C of the coil 320. In some examples, the material 324 disposed within the gaps 320C of the coil 320 includes a polymeric material. In some examples, the material 324 includes one or more engineering plastics, such as, for instance, a thermoplastic elastomer. In some examples, the material 324 includes a Pebax® medical thermoplastic elastomer. In further examples, the material 324 includes Pebax® 55D medical thermoplastic elastomer. In other examples, the material 324 includes one or more of polyurethane, nylon, polyethylene, and/or polyether block amide (PEBA). In still other examples, the gaps 320C can include no such material therein with the gaps 320C forming air spaces in between the windings of the coil 320.

The coil 320, in some examples, can extend along the length 300L of the shaft 300. In other examples, the coil 320 extends only along a portion of the length 300L of the shaft 300, for instance, if it is desirable for the shaft 300 to include the performance characteristics of the coil 320 only over a portion of the shaft length 300L. In still other examples, the coil 320 can extend intermittently along the length 300L of the shaft 300 with two or more portions of the shaft having no coil 320 therein, for instance, if it is desirable for the shaft 300 to include the performance characteristics of the coil 320 only intermittently over the shaft length 300L. In some examples, two or more different coils 320 (for instance, coils 320 formed from different materials, having different materials within the gaps 320C between windings, having different pitches 320P, and/or having different cross-sectional shapes of the flat wire 321) can be used along the length 300L of the shaft 300 to vary performance characteristics of the coil 320 over the shaft length 300L.

In some examples, a jacket 330 is disposed around and outwardly from the coil 320. The jacket 330, in some examples, forms the outer surface 304 of the shaft 300. In some examples, the jacket 330 can be formed from one or more engineering plastics, such as, for instance, a thermoplastic elastomer. In some examples, the jacket 330 is formed from a Pebax® medical thermoplastic elastomer. In other examples, the jacket 330 is formed from one or more of polyurethane, nylon, polyethylene, and/or polyether block amide (PEBA). In various examples, the jacket 330 can be formed from one or more materials having various durometers to provide various stiffness characteristics for the outer surface 304 of the shaft 300. In some examples, the jacket 330 can be formed entirely from a single material of a given durometer to provide the outer surface 304 of the shaft 300 with uniform stiffness characteristics along the length 300L of the shaft 300. In other examples, two or more materials of different durometers can be used to provide the outer surface 304 of the shaft 300 with varying stiffness characteristics along the length 300L of the shaft 300. In some examples, the jacket 330 can be heat set in place to create an integral structure of the shaft 300. In some examples, the material 324 is the same material as the jacket 330. In this way, instead of separately filling the gaps 320C between the windings of the coil 320 as described above, the jacket 330, in some examples, is heat set and flows, not only around and outwardly from the coil 320, but also within the gaps 320C of the coil 320, thereby integrally forming the jacket 330 and the material 324 within the gaps 320C of the coil 320.

Figure 6:
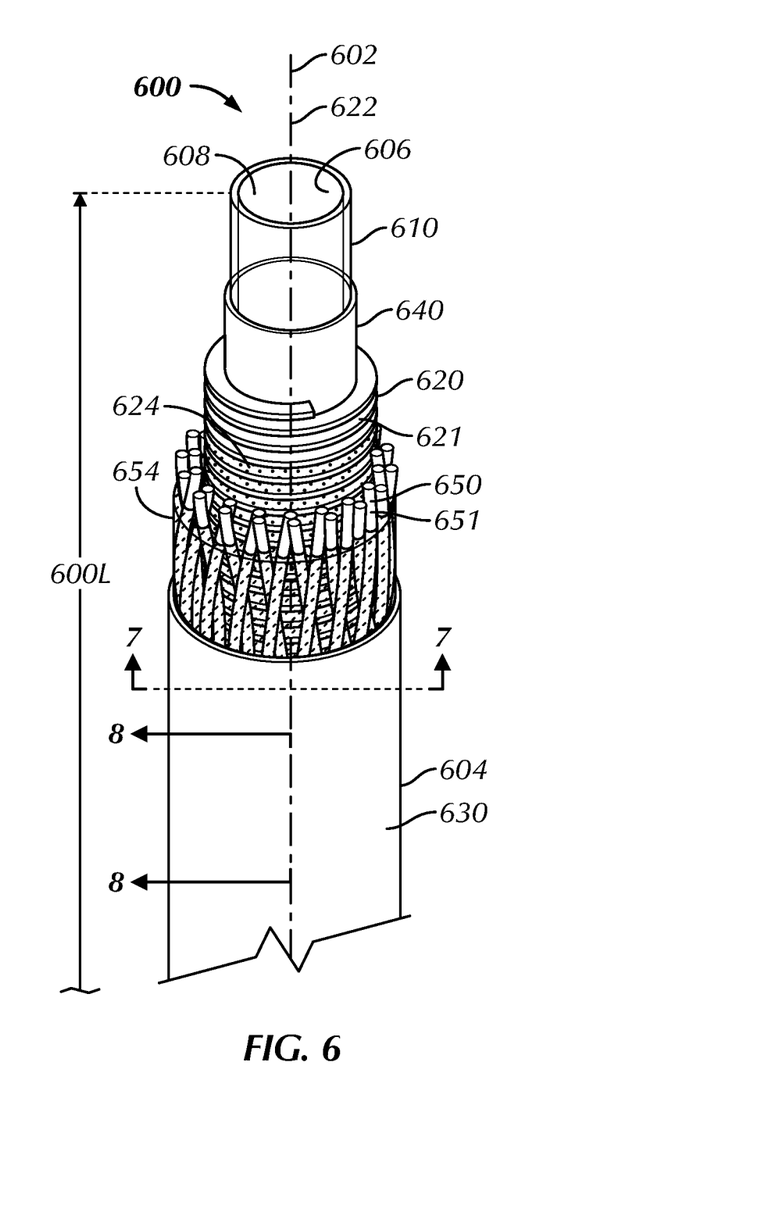
FIG. 6 is a partially cut away perspective view of a shaft of a medical device including a coil in accordance with at least one example of the invention.
Figure 7:
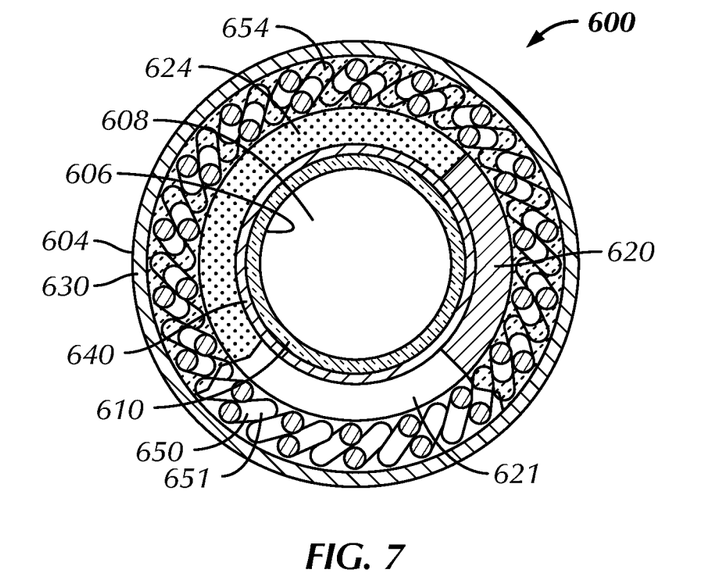
FIG. 7 is a cross-sectional view of a shaft of a medical device including a coil in accordance with at least one example of the invention, the cross section being taken along plane-7 of FIG. 6.
Figure 8:
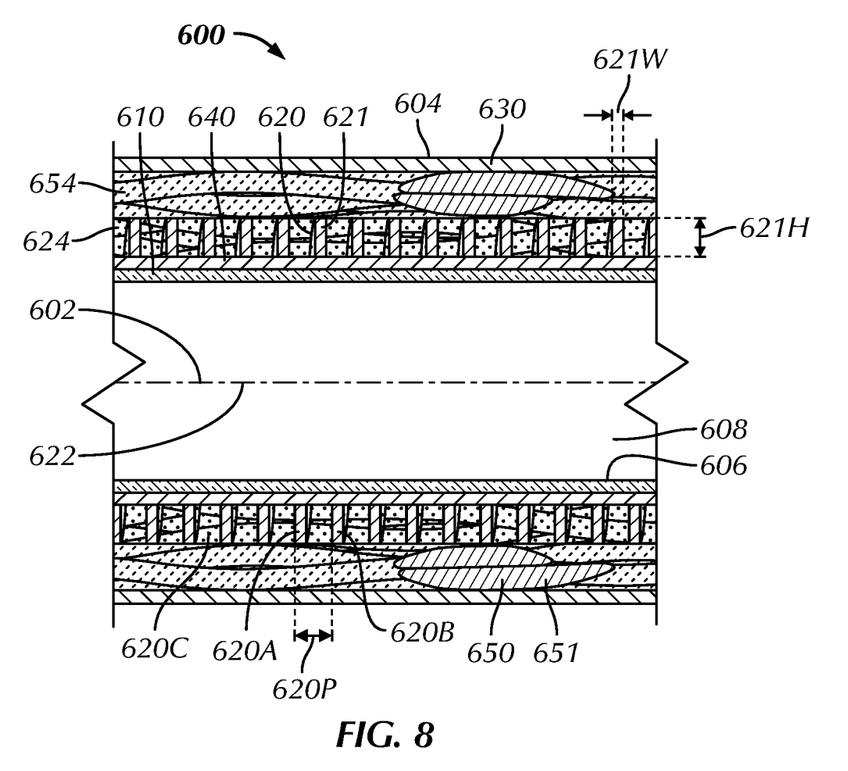
FIG. 8 is a cross-sectional view of a shaft of a medical device including a coil in accordance with at least one example of the invention, the cross section being taken along plane 8 of FIG. 6.

Referring to FIGS. 6-8, in some examples, a shaft 600 is shown for use with an elongate medical device (such as the elongate medical device 10 of FIG. 1, for instance). In some examples, the shaft 600 extends along a shaft length 600L and includes a shaft axis 602, an outer surface 604, and an inner surface 606. In some examples, the inner surface 606 is substantially cylindrical along the shaft length 600L defining an inner lumen 608 of the shaft 600.

In some examples, the shaft 600 includes a liner 610 forming the inner surface 606 of the shaft 600. In some examples, the liner 610 is formed from a lubricious material, for instance, to facilitate passing of devices within the lumen 608 of the shaft 600 by providing lubricity for devices passing through the lumen 608. In other examples, the liner 610 is formed from another material, such as a non-lubricious material, for instance, if it is desirable to have a lumen 608 with a less or non-lubricious surface. In some examples, a tie layer 640 is disposed around and radially outwardly from the liner 610.

In some examples, a coil 620 is disposed around and outwardly from the liner 610. In some examples, the coil 620 is similar to the coils 220, 320 described above. In some examples, the coil 620 includes a flat wire 621 formed into the coil 620. In some examples, the coil 620 is formed such that it forms a generally tubular shape along a coil axis 622. In some examples, the coil axis 622 is disposed substantially colinear to the shaft axis 602 with the coil 620 disposed within the shaft 600. In some examples, the coil 620 is formed by the flat wire 621 being coiled on edge. In some examples, the flat wire 621 includes a height 621H extending substantially radially with respect to the coil 620 and the shaft 600 (and substantially perpendicular to the coil axis 622) and a width 621W extending substantially longitudinally with respect to the coil 620 and the shaft 600 (and substantially parallel to the coil axis 622). In some examples, the tie layer 640 is disposed between the liner 610 and the coil 620 and provides for improved securement of the coil 620 to the liner 610 below. In other examples, the shaft 600 need not include the tie layer, such that the coil 620 is disposed directly against and radially outwardly from the liner 610. In some examples, the tie layer 640 can be formed from one or more engineering plastics, such as, for instance, a thermoplastic elastomer. In some examples, the tie layer 640 is formed from a Pebax® medical thermoplastic elastomer. In further examples, the tie layer 640 is formed from a Pebax® 55D medical thermoplastic elastomer. In other examples, the tie layer 640 includes one or more of polyurethane, nylon, polyethylene, and/or polyether block amide (PEBA).

In various examples, the coil 620 can be formed in various configurations depending upon the application and performance characteristics desired for the elongate medical device (such as the elongate medical device 10 of FIG. 1, for instance) within which the coil 620 is being used. For instance, in some examples, various sizes of the flat wire 621 are contemplated in order to provide different characteristics of the various examples of the flat wire 621. For instance, a cross-sectional area of the flat wire 621 can be increased in various examples, to generally provide greater strength (tensile, compressive, torque, and/or flexural) and greater rigidity. In other examples, the cross-sectional area of the flat wire 621 can be decreased to generally provide decreased strength (tensile, compressive, torque, and/or flexural) and greater flexibility. In other examples, the height 621H and width 621W of the flat wire 621 can be altered to provide different characteristics of the coil 620. In some examples, the height 621H of the flat wire 621 is equal to the width 621W of the flat wire 621 of the coil 620, such that the cross section of the flat wire 621 is substantially square-shaped. In other examples, the height 621H of the flat wire 621 is greater than the width 621W of the flat wire 621 of the coil 620.

In some examples, the coil 620 includes a pitch 620P, which is defined as a distance between adjacent windings, such as between winding 620A and winding 620B of the coil 620. In some examples, the pitch 620P can be used to impart performance characteristics to the coil 620. In some examples, the pitch 620P of the coil 620 is substantially uniform or consistent along a coil length. In other examples, the pitch 620P can vary along the coil length. A smaller pitch 620P, in some examples, can give the coil 620 greater strength (tensile, compressive, torque, and/or flexural) and greater rigidity. In other examples, a larger pitch 620P can give the coil 620 decreased strength (tensile, compressive, torque, and/or flexural) and greater flexibility. In some examples, the pitch 620P is variable along the coil length and, in turn, the shaft length 600L, to provide different performance characteristics of the shaft 600 over the shaft length 600L. In various examples, the pitch 620P of the coil 620 can vary from close touching surfaces to several times the width 621W of the flat wire 621. In some examples, the pitch 620P of the coil 620 is twice the width 621W of the flat wire 621.

In various examples, the coil 620 can be formed from one or more different materials, depending upon the application for which the elongate medical device (such as the elongate medical device 10 of FIG. 1, for instance) within which the coil 620 is being used. In some examples, the coil 620 is formed from stainless steel. In other examples, the coil 620 can be formed from other ferric materials. In still other examples, the coil 620 can be formed from one or more non-ferric materials, such as, but not limited to, nickel and/or Nitinol. In some examples, the coil 620 can be formed from a combination of materials with different portions of the coil 620 being formed from different materials based upon the desired performance characteristics of each of the portions of the coil 620.

In some examples, a material 624 is disposed within gaps 620C of the coil 620. In some examples, the gaps 620C are in between windings (such as, for instance, the windings 620A and 620B) of the coil 620. In some examples, the material 624 is configured to provide compression support for the coil 620, such that the material 624 helps to maintain spacing in between the windings of the coil 620 under compressive loading of the coil 620. In some examples, the material 624 inhibits compression of the coil 620 under compressive loading while still allowing some compression of the coil 620 as well as flexibility of the coil 620 in bending. In some examples, the material 624 is used to fill the gaps 620C in the coil 620 to secure the coil 620 in place during subsequent assembly operations of the shaft 600. In some examples, the material 624 includes a separate component that is placed over the coil 620 once the coil 620 is assembled onto the shaft 600, which is then heated to flow into the gaps 620C of the coil 620. In some examples, the material 624 disposed within the gaps 620C of the coil 620 includes a polymeric material. In some examples, the material 624 includes one or more engineering plastics, such as, for instance, a thermoplastic elastomer. In some examples, the material 624 includes a Pebax® medical thermoplastic elastomer. In further examples, the material 624 includes Pebax® 55D medical thermoplastic elastomer. In other examples, the material 624 includes one or more of polyurethane, nylon, polyethylene, and/or polyether block amide (PEBA). In still other examples, the gaps 620C can include no such material therein with the gaps 620C forming air spaces in between the windings of the coil 620.

The coil 620, in some examples, can extend along the length 600L of the shaft 600. In other examples, the coil 620 extends only along a portion of the length 600L of the shaft 600, for instance, if it is desirable for the shaft 600 to include the performance characteristics of the coil 620 only over a portion of the shaft length 600L. In still other examples, the coil 620 can extend intermittently along the length 600L of the shaft 600 with two or more portions of the shaft having no coil 620 therein, for instance, if it is desirable for the shaft 600 to include the performance characteristics of the coil 620 only intermittently over the shaft length 600L. In some examples, two or more different coils 620 (for instance, coils 620 formed from different materials, having different materials within the gaps 620C between windings, having different pitches 620P, and/or having different cross-sectional shapes of the flat wire 621) can be used along the length 600L of the shaft 600 to vary performance characteristics of the coil 620 over the shaft length 600L.

In some examples, a jacket 630 is disposed around and outwardly from the coil 620. The jacket 630, in some examples, forms the outer surface 604 of the shaft 600. In some examples, the jacket 630 can be formed from one or more engineering plastics, such as, for instance, a thermoplastic elastomer. In some examples, the jacket 630 is formed from a Pebax® medical thermoplastic elastomer. In other examples, the jacket 630 is formed from one or more of polyurethane, nylon, polyethylene, and/or polyether block amide (PEBA). In various examples, the jacket 630 can be formed from one or more materials having various durometers to provide various stiffness characteristics for the outer surface 604 of the shaft 600. In some examples, the jacket 630 can be formed entirely from a single material of a given durometer to provide the outer surface 604 of the shaft 600 with uniform stiffness characteristics along the length 600L of the shaft 600. In other examples, two or more materials of different durometers can be used to provide the outer surface 604 of the shaft 600 with varying stiffness characteristics along the length 600L of the shaft 600. In some examples, the jacket 630 can be heat set in place to create an integral structure of the shaft 600. In some examples, the material 624 is the same material as the jacket 630. In this way, instead of separately filling the gaps 620C between the windings of the coil 620 as described above, the jacket 630, in some examples, is heat set and flows, not only around and outwardly from the coil 620, but also within the gaps 620C of the coil 620, thereby integrally forming the jacket 630 and the material 624 within the gaps 620C of the coil 620.

In some examples, a braid layer 650 is disposed between the liner 610 and the jacket 630. The braid layer 650, in some examples, is disposed between the coil 620 and the jacket 630, being disposed radially outwardly from the coil 620 and radially inwardly from the jacket 630. In some examples, the braid layer 650 is configured to increase tensile and/or torque strength for the shaft 600. The braid layer 650, in some examples, is formed from several wires 651 woven together. In various examples, the braid layer 650 can include between four to thirty-two wires 651. In some examples, more than thirty-two wires 651 is possible, although a final device size may increase in diameter to accommodate the greater number of wires 651 in the braid layer 650. In various examples, the wires 651 of the braid layer 650 can include various cross sections, including, but not limited to round, flat, polygonal, or the like. In some examples, all of the wires 651 in the braid layer 650 can include the same cross-sectional shape. In other examples, different wires 651 within the braid layer 650 can include different cross-sectional shapes from one another. In some examples, the wires 651 of the braid layer 650 can all be substantially similar in size. In other examples, the wires 651 of the braid layer 650 can vary in size from one another.

In some examples, a material 654 is disposed around the braid layer 650. In some examples, the material 654 is configured to provide support for the braid layer 650 under loading of the shaft 600 and, in turn, the braid layer 650. In some examples, the material 654 inhibits compression of the braid layer 650 under compressive loading while still allowing some compression of the braid layer 650 as well as flexibility of the braid layer 650 in bending. In some examples, the material 654 is used to fill space in the braid layer 650 to secure the braid layer 650 in place during subsequent assembly operations of the shaft 600. In some examples, the material 654 includes a separate component that is placed over the braid layer 650 once the braid layer 650 is assembled onto the shaft 600, which is then heated to flow into the space around and within the braid layer 650. In some examples, the material 654 disposed within and around the braid layer 650 includes a polymeric material. In some examples, the material 654 includes one or more engineering plastics, such as, for instance, a thermoplastic elastomer. In some examples, the material 654 includes a Pebax® medical thermoplastic elastomer. In further examples, the material 654 includes Pebax® 55D medical thermoplastic elastomer. In other examples, the material 654 includes one or more of polyurethane, nylon, polyethylene, and/or polyether block amide (PEBA).

In some examples, the jacket 630 can be heat set in place to create an integral structure of the shaft 600. In some examples, the material 654 is the same material as the jacket 630. In this way, instead of separately filling the space within the braid layer 650 as described above, the jacket 630, in some examples, is heat set and flows around and outwardly from the braid layer 650, as well as within the space within the braid layer 650, to integrally form the jacket 630 and the material 654 within the space within the braid layer 650. In still other examples, both of the materials 624, 654 are the same material as the jacket 630. In this way, instead of separately filling the gaps 620C between the windings of the coil 620 and the space within the braid layer 650 as described above, the jacket 630, in some examples, is heat set and flows, not only around and outwardly from the braid layer 650, but also within the gaps 620C of the coil 620 and within the space within the braid layer 650, thereby integrally forming the jacket 630 and the materials 624, 654 within the gaps 620C of the coil 620 and within the space within the braid layer 650. In still other examples, the space within and around the braid layer 650 can include no such material therein with the space forming air spaces within the braid layer 650.

The present inventors have recognized, among other things, that the present subject matter can be used to provide for elongate medical devices, such as, for instance, delivery system devices for structural heart implant delivery, with improved flexibility, radial strength, and kink resistance in bending over that of a conventional elongate medical device. In various examples, the present subject matter is advantageous in that it provides greater compression strength and reduces compression deflection over conventional elongate medical devices. In some examples, this improved performance is due to the wider surface area of wire faces in contact with one another as a coil of the present inventive subject matter is collapsed in an axial direction of the coil. In some examples, the present invention provides for a reinforcement member to provide radial strength from device crushing and maintain a high level of flexibility in bending, which, in combination with radial strength, helps improve the kink resistance of the shaft when it is bent into a small radius. While various advantages of the exemplary systems are listed herein, this list is not considered to be complete, as further advantages may become apparent from the description and figures presented herein.

Although the subject matter of the present patent application has been described with reference to various examples, workers skilled in the art will recognize that changes can be made in form and detail without departing from the scope of the subject matter recited in the below claims.

The above Detailed Description includes references to the accompanying drawings, which form a part of the Detailed Description. The drawings show, by way of illustration, specific examples in which the present apparatuses and methods can be practiced. These embodiments are also referred to herein as "examples."

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In this document, the terms "a" or "an" are used to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "about" and "approximately" or similar are used to refer to an amount that is nearly, almost, or in the vicinity of being equal to a stated amount.

In the appended claims, the terms "including" and "in which" are used as the plain-English equivalents of the respective terms "comprising" and "wherein." Also, in the following claims, the terms "including" and "comprising" are open-ended, that is, an apparatus or method that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to quickly ascertain the nature of the technical disclosure. It is submitted with the understanding that it will not be used to interpret or limit the scope or meaning of the claims.

The invention claimed is:

1. A shaft for an elongate medical device, the shaft extending along a shaft length, the shaft including a shaft axis, an outer surface, and an inner surface, the inner surface defining an inner lumen, the shaft comprising:
   a liner forming the inner surface of the shaft;
   a coil disposed around and outwardly from the liner, the coil being formed from a flat wire, the flat wire including a wire width and a wire height, wherein the wire height is greater than the wire width, the wire height extending substantially radially with respect to the shaft and the wire width extending substantially longitudinally with respect to the shaft; and
   a jacket disposed at least around and outwardly from the coil, the jacket forming the outer surface of the shaft.

2. The shaft of claim 1, wherein the coil includes a coil axis that is disposed substantially colinear to the shaft axis.

3. The shaft of claim 2, wherein the wire width is measured parallel to the coil axis and the wire height is measured perpendicular to the coil axis.

4. The shaft of claim 1, wherein a pitch of the coil is substantially consistent along a coil length.

5. The shaft of claim 1, wherein a pitch of the coil is substantially equal to twice the wire width.

6. The shaft of claim 1, wherein a pitch is variable along the shaft length to provide different shaft performance characteristics over the shaft length.

7. The shaft of claim 1, wherein the liner is formed from a lubricious material.

8. The shaft of claim 1, comprising a material disposed within gaps of the coil, the material configured to provide compression support for the coil.

9. The shaft of claim 8, wherein the material disposed within the gaps of the coil includes a polymeric material.

10. The shaft of claim 1, comprising a braid layer disposed between the liner and the jacket, the braid layer configured to increase tensile strength for the shaft.

11. An elongate medical device comprising:
    a shaft extending along a shaft length, the shaft including a shaft axis, an outer surface, and an inner surface, the inner surface defining an inner lumen, the shaft including:
      a liner forming the inner surface of the shaft;
      a coil disposed around and outwardly from the liner, the coil being formed from a flat wire, the flat wire including a wire width and a wire height, wherein the wire height is greater than the wire width, the wire height extending substantially radially with respect to the shaft and the wire width extending substantially longitudinally with respect to the shaft; and
      a jacket disposed at least around and outwardly from the coil, the jacket forming the outer surface of the shaft.

12. The device of claim 11, wherein the coil includes a coil axis that is disposed substantially colinear to the shaft axis.

13. The device of claim 12, wherein the wire width is measured parallel to the coil axis and the wire height is measured perpendicular to the coil axis.

14. The device of claim 11, comprising a material disposed within gaps of the coil, the material configured to provide compression support for the coil.

15. The device of claim 11, comprising a braid layer disposed between the liner and the jacket, the braid layer configured to increase torque strength for the shaft.

16. A shaft for an elongate medical device, the shaft extending along a shaft length, the shaft including a shaft axis, an outer surface, and an inner surface, the inner surface defining an inner lumen, the shaft comprising:
    a liner forming the inner surface of the shaft;

a coil disposed around and outwardly from the liner, the coil including a coil axis that is disposed substantially colinear to the shaft axis, the coil being formed from a flat wire, the flat wire including a wire width and a wire height, wherein the wire height is greater than the wire width, the wire width being measured parallel to the coil axis and the wire height being measured perpendicular to the coil axis;

a material disposed within gaps of the coil, the material configured to provide compression support for the coil; and a jacket disposed at least around and outwardly from the coil, the jacket forming the outer surface of the shaft.

17. The shaft of claim 16, wherein a pitch of the coil is substantially consistent along a coil length.

18. The shaft of claim 16, wherein a pitch is variable along the shaft length to provide different shaft performance characteristics over the shaft length.

19. The shaft of claim 16, wherein the liner is formed from a lubricious material.

20. The shaft of claim 16, comprising a braid layer disposed between the liner and the jacket, the braid layer configured to increase tensile strength or torque strength for the shaft.

* * * * *